US007011249B2

(12) United States Patent
Tang

(10) Patent No.: US 7,011,249 B2
(45) Date of Patent: Mar. 14, 2006

(54) CARD CARRIER AND DISPLAY PACKAGE

(75) Inventor: Michael Tang, Monterey Park, CA (US)

(73) Assignee: Harvard Label, Inc., Vernon, CA (US)

( * ) Notice: Subject to any disclaimer, the term of this patent is extended or adjusted under 35 U.S.C. 154(b) by 0 days.

(21) Appl. No.: 10/913,025

(22) Filed: Aug. 6, 2004

(65) Prior Publication Data

US 2006/0027663 A1 Feb. 9, 2006

(51) Int. Cl.
*G06K 7/00* (2006.01)

(52) U.S. Cl. ...................................................... 235/486

(58) Field of Classification Search ................ 235/486, 235/487; 229/92.8; 428/43, 78; 206/307, 206/756; 40/124.01, 124.06, 124.09, 124.11, 40/124.12; 283/100, 103–106

See application file for complete search history.

(56) References Cited

U.S. PATENT DOCUMENTS 5,531,482 A 7/1996 Blank
5,650,209 A * 7/1997 Ramsburg et al. ............ 428/43
5,720,158 A 2/1998 Goade, Sr.
5,921,584 A 7/1999 Goade, Sr.
6,145,665 A * 11/2000 Krahn ........................ 206/756
6,732,459 B1 * 5/2004 Clark ...................... 40/124.06
2002/0100797 A1 * 8/2002 Hollingsworth et al. ... 229/92.8
2004/0146688 A1 * 7/2004 Treat ........................... 428/78

* cited by examiner

*Primary Examiner*—Thien M. Le
*Assistant Examiner*—April Taylor
(74) *Attorney, Agent, or Firm*—Christie, Parker & Hale, LLP

(57) ABSTRACT

A card, a first panel, a second panel opposing the first panel, and a detachable tab connected to at least one of the first panel and the second panel taken together form a card carrier system. The card is provided between the first panel and the second panel and secured to at least one of the first panel and the second panel such that the card is at least partially covered by at least one of first panel and the second panel. The detachable tab taken together with at least one of the first panel and the second panel covers a greater portion of the card than either the first or second panel alone. The card has an exposed portion extending past both the first panel and the second panel such that when the detachable tab is removed, the exposed portion of the card may be encoded.

18 Claims, 6 Drawing Sheets

CARD CARRIER AND DISPLAY PACKAGE

FIELD OF THE INVENTION

The present invention relates generally to card display packages and their methods of manufacture.

BACKGROUND

Debit cards distributed by financial institutions are typically forwarded to retail merchants for sale to individual purchasers. These cards allow the holder prepaid access to existing credit networks for making purchases, eliminating the need to carry cash on hand. They may be used to provide authorization for the rental or purchase of goods and services, or may be used as a gift certificate granting the holder credit for various goods and services.

It has been the practice with prepaid debit cards that a merchant purchases a stock of cards just as he would any other good, at which time he incurs a charge from the vendor for the value of the debit card. By displaying these cards for sale in his store, the merchant exposes himself to the loss of the valuable cards through shrinkage and theft. Furthermore, the merchant must maintain individual inventory stocks for each different value of debit card he wishes to sell. the merchant's working capital is restricted by the need to maintain these stocks well in advance of when the debit cards are actually sold as retail items to individual purchasers.

To address these problems, merchants have begun to sell non activated, or "zero balance" debit cards which have no intrinsic value until they are activated by the merchant's magnetic card reader. It is now a common practice to sell such cards to purchasers with the activation taking place at the merchant counter at the time of sale.

In this manner, the merchant reduces his overhead because the value of the inactivated debit cards is not payable to the wholesale vendor of the cards until the card itself is actually distributed by the merchant at the point of sale ("POS"). Theft is also no longer a concern given that the inactivated debit cards have very little value.

Upon sale of a debit card to a purchaser, the merchant encodes the debit card with a specific balance paid for by the purchaser. To do so, the magnetic stripe on the debit card must be exposed so that the card itself may be passed through the merchant's magnetic card reader. These cards are often sold mounted in or on some sort of card carrier or protective/display packaging. In order to keep this packaging from interfering with the encoding operation carried out by the merchant at the time of purchase, prior art packages exist wherein a card is mounted so that it is permanently exposed, and so that none of the packaging overlaps the exposed portion of the card containing the magnetic strip to be encoded.

These prior art packaging systems may not fully and securely enclose the card to be sold, nor do they provide for an attractive graphical display area. This reduces the surface area of the holder useful for marketing materials and other promotional items. It may be desirable, according to one embodiment, that a packaging system be provided with an attractive graphical display that surrounds the card mounted within, while at the same time allowing a merchant to easily encode the card when purchased without first removing the card from the packaging in which the card is displayed.

SUMMARY

In an exemplary embodiment of the present invention, a card package comprises a card carrier for mounting a card having an encodable magnetic strip disposed transversely across a portion of the card. A detachable tag is provided as part of the card carrier, wherein the tag of the card carrier is manipulated to expose the card within the card carrier, allowing the card to be swiped though an encoding device without fully removing the card from the card carrier.

A card carrier system comprises a card, a first panel, a second panel opposing the first panel, and a detachable tab connected to at least one of the first panel and the second panel. The card is provided between the first panel and the second panel and secured to at least one of the first panel and the second panel such that the card is at least partially covered by at least one of first panel and the second panel. The detachable tab taken together with at least one of the first panel and the second panel covers a greater portion of the card than at least one of the first panel and the second panel alone.

Figure 1:
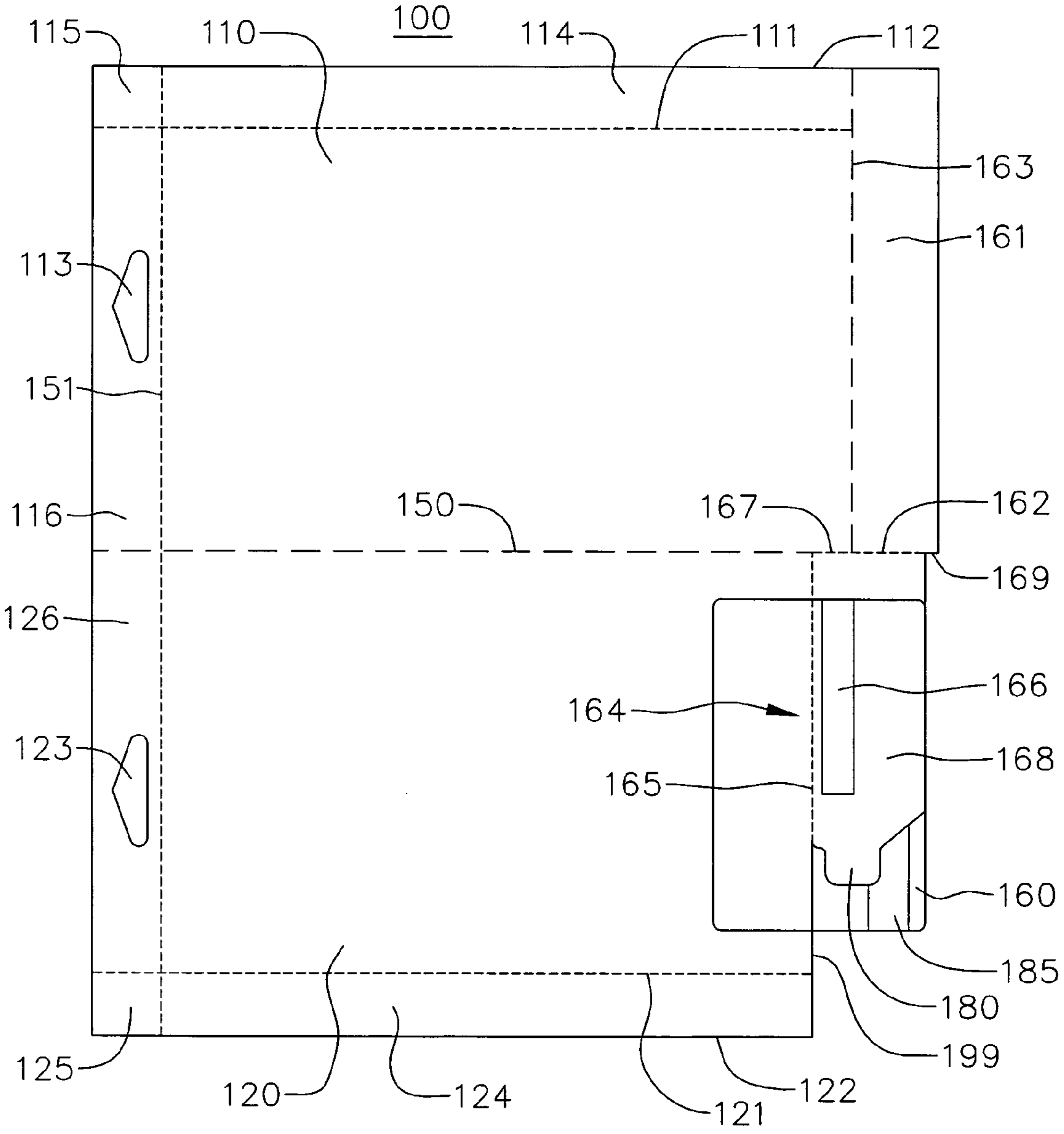
FIG. 1 shows a planar view of one embodiment of a foldable envelope carrier.

Before any embodiment of the invention is explained in detail, it is to be understood that the invention is not limited in its application to the details of construction and arrangements of components set forth in the following description, or illustrated in the drawings. The invention is capable of alternative embodiments and of being practiced or being carried out in various ways. Also, it is to be understood that the terminology used herein is for the purpose of illustrative description and should not be regarded as limiting.

DETAILED DESCRIPTION OF THE INVENTION

FIG. 1 shows a planar view of one embodiment of a foldable envelope carrier 100 comprising a front panel 110 and a rear panel 120 formed out of a sheet of material having a central perforation 150 dividing the front panel 110 and the rear panel 120. A card 160, which is in one embodiment a debit card allowing the holder prepaid access to existing credit networks for making purchases, is secured to at least one of the front panel 110 or the rear panel 120, more specifically the rear panel 120 in the embodiment shown in FIG. 1. In a further embodiment, the card 160 is selectively detachable from adhesive glue securing it to the foldable envelope carrier 100.

The foldable envelope carrier 100 is prepared by cutting a sheet of material to a designated size, typically 9⅞" by 8½" in dimension. The foldable envelope carrier 100 must then be correctly matched with a corresponding card 160, which has been separately prepared. The nature of this preparation will be made evident in later figures. The card 160 may be attached to the foldable envelope carrier 100 by an adhesive, by inserting the card 160 into a plurality of slits (not shown) formed in the foldable envelope carrier 100, or any other appropriate method known to one skilled in the art.

A top perforation 151 is provided along one edge of the foldable envelope carrier 100. The top perforation 151 runs perpendicular to the central perforation 150 and separates a pair of top border pieces from the remainder of the foldable envelope carrier 100. Specifically, a top front border 116 is formed as a subdivision of the front panel 110 and a top rear border 126 is formed as a subdivision of the rear panel 120 by the top perforation 151. The top front border 116 is provided with a front peg aperture 113, and the top rear border 126 is provided with a rear peg aperture 123. In one embodiment, were the foldable envelope carrier 100 to be folded along the central perforation 150 such that the front panel 110 was disposed facing the rear panel 120, the front and rear peg apertures 113 and 123 would align with one another.

The front panel 110 and the rear panel 120 are in one embodiment formed as substantially rectangular sections having a pair of long sides and a pair of short sides. One pair of long sides of the front panel 110 and the rear panel 120 meet at the central perforation 150. The remaining front panel edge 112 of the front panel 110 and rear panel edge 122 of the rear panel 120 comprise the opposing long side of each of the front panel 110 and the rear panel 120.

In one embodiment of the foldable envelope carrier 100, a pair of side perforations are provided running substantially parallel to the central perforation 150, and are disposed proximate to the front panel edge 112 of the front panel 110 and the rear panel edge 122 of the rear panel 120 to comprise a side front perforation 111, and a side rear perforation 121 respectively.

In much the same way that the top perforation 151 separates the top front border 116 from the remainder of the front panel 110, the side front perforation 111 separates the side front border 114 from the remainder of the front panel 110. Likewise, the side rear perforation 121 separates the side rear front border 124 from the remainder of the rear panel 120. The intersection of the top perforation 151 with the side front perforation 111 and the side rear perforation 121 delineates a front corner 115 and a rear corner 125 respectively as further subdivisions of the front panel 110 and the rear panel 120.

Thus, a foldable envelope carrier 100 is provided having a front panel 110 and a rear panel 120 separated by a central perforation 150. The front panel 110 and a rear panel 120 of the foldable envelope carrier 100 may be folded against each other along the central perforation 150. Subsequently, the side front border 114 may be secured to the side rear border 124 and the top front border 116 to the top rear border 126 to provide a semi-enclosed envelope or pocket to contain the card 160 which, as discussed above, is secured to one of the front panel 110 or the rear panel 120. The securing of opposing borders of the foldable envelope carrier 100 may be carried out with adhesive, staples or any other appropriate method known to one skilled in the art.

In an alternative embodiment, the side front border 114 and the side rear border 124 may be the only point of attachment; in this case no union is necessary between the top front border 116 and the top rear border 126. Furthermore, in the alternative embodiment just discussed the foldable envelope carrier 100 may be formed without any top perforation 151, top front border 116 or rear front border 126. In another alternative embodiment, the card 160 may be secured to both the front and rear panels 110 and 120 using an adhesive such that this adhesive bond between the card 160 and the front and rear panels 110 and 120 is the sole means of securing the front rear panels 110 to the rear panel 120.

The card 160 (which in one embodiment comprises a magnetic stripe encoded plastic card and substrate) is inserted into the foldable envelope carrier 100 which is then sealed to ensure the card 160 stays within the foldable envelope carrier 100 despite jostling or other agitation. The foldable envelope carrier 100 holds the card 160 within and serves to display additional information to potential purchasers including promotional information, variable bar codes and purchaser information.

In an alternative embodiment, a second card (not shown) may be attached to the foldable envelope carrier 100 in that same manner as the card 160. This requires the preparation of a second card, matching the second card with the foldable envelope carrier 100 and attaching the second card to the foldable envelope carrier 100. As with the card 160, the second card may be attached to either the front panel 110 or the rear panel 120. However, in this embodiment, the weight of the contents in the foldable envelope carrier 100 has increased, and thus so has the weight of the entire assembly of the foldable envelope carrier 100 and the cards within.

Figure 2:
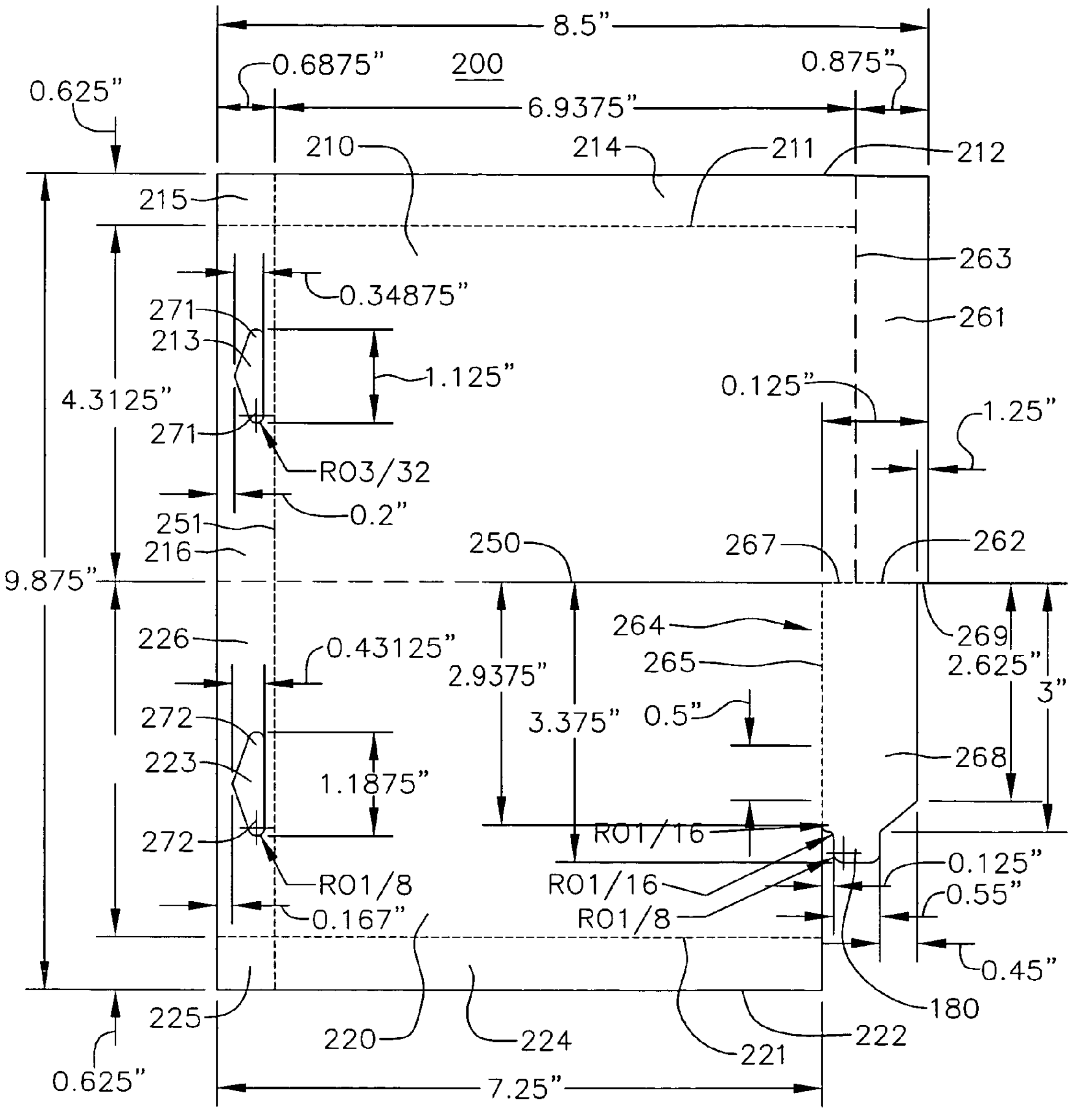
FIG. 2 shows an alternative embodiment of a foldable envelope carrier having the dimensions shown.

FIG. 2 shows one alternative embodiment of a foldable envelope carrier 200 having the dimensions shown. It is understood that these measurements are exemplary and that the invention may be carried out with a foldable envelope carrier 200 having substantially different proportions. The measurements shown, which for the most part comprise distances between elements of the envelope carrier 200, also include the radii of curvature for elements such as the chamfers 271 and 272 of the front peg aperture 213 and the rear peg aperture 223, as well as others.

Figure 3:
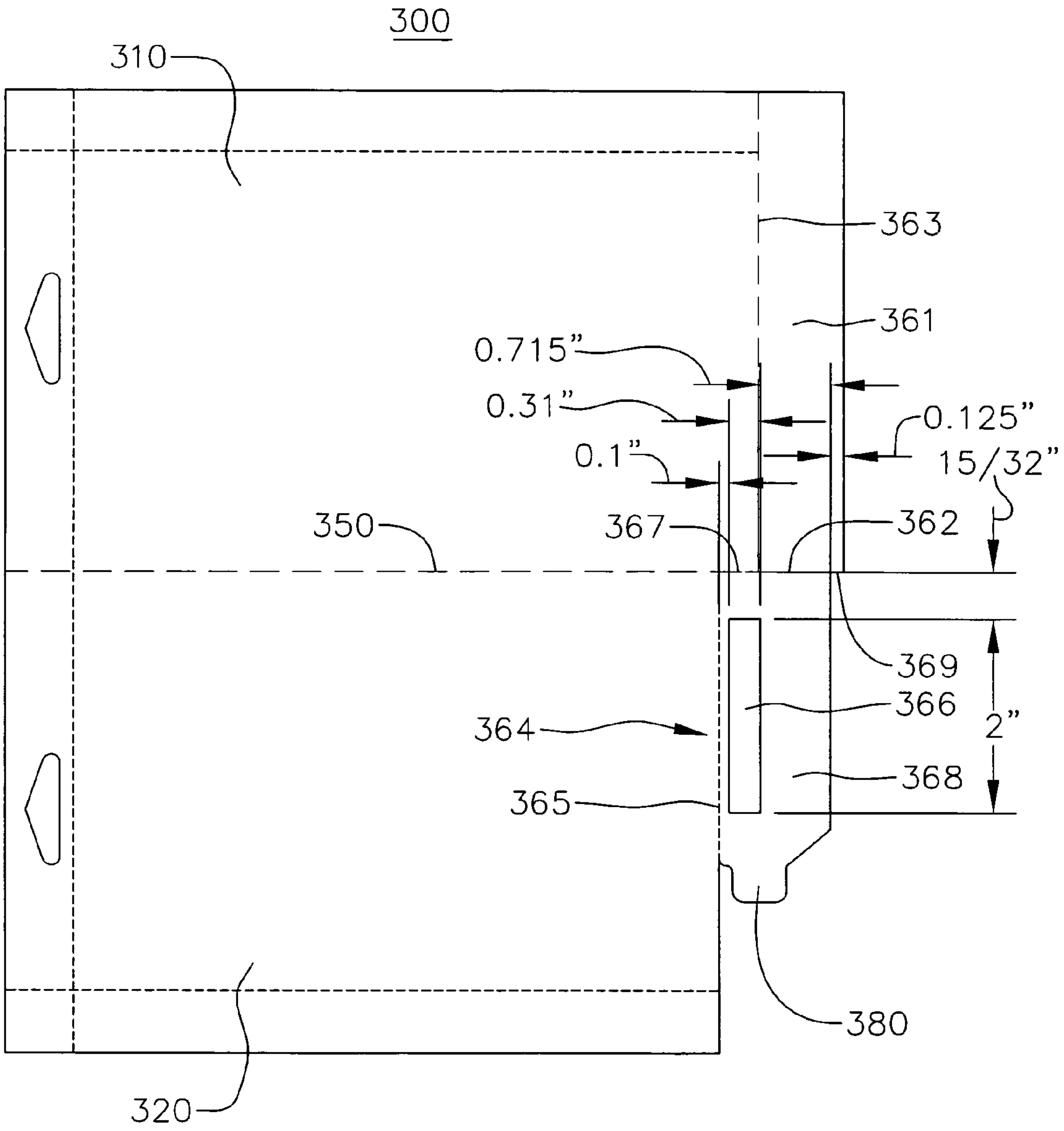
FIG. 3 shows a further view of an embodiment of a foldable envelope carrier wherein a removable tab including a window therein has the dimensions shown.

FIG. 3 shows a further view of an embodiment of a foldable envelope carrier wherein a removable tab 368 including a window 366 therein has the dimensions shown. As with FIG. 2, it is understood that FIG. 3 shows only one alternative embodiment of a foldable envelope carrier 300 having the dimensions shown, and that other embodiments are possible. FIG. 3 shows but one specific embodiment for the placement and size of a window 366 on the removable tab 368.

Returning now to FIG. 1, the foldable envelope carrier 100 has been provided with the central perforation 150 so that in one embodiment, the foldable envelope carrier 100 may be folded along the central perforation 150 so that opposing borders of the foldable envelope carrier 100 have been secured to each other to enclose the card 160. Specifically, the side front border 114 may be secured to the side rear border 124, and the top front border 116 may be secured to the top rear border 126. A purchaser of the foldable envelope carrier 100 and enclosed card may tear off the side front border 114, side rear border 124, top front border 116 and top rear border 126 along adjacent perforations in order to unfold the foldable envelope carrier 100. This allows the purchaser easier access to the card 160, and permits the card 160 to be more easily removed from the arrangement securing it to the foldable envelope carrier 100.

However, a merchant must have access to the card 160 at the time of sale in order to encode a specific balance on the magnetic strip 185. Substantially all of the card 160 is blocked by the structure of the foldable envelope carrier 100 in the embodiment of the invention shown in FIG. 1. While it is desirable to enclose the card 160 with the structure of the foldable envelope carrier 100 in order to protect and conceal the card 160, it is not desirable to require a merchant to completely disassemble the foldable envelope carrier 100 in the manner described above to access the magnetic strip 185 of the card 160.

As such, a removable tab 168 is provided adjacent to the rear panel 120 and separated from the front panel 110 by a first removable tab hinge 162 and a second removable tab hinge 167. The removable tab 168 is furthermore attached to the rear panel 120 by a bottom rear perforation 164. The removable tab 168 provided as part of the foldable envelope carrier 100 may be partially or completely detached from the foldable envelope carrier 100 to further expose the card 160 within the foldable envelope carrier 100.

In one embodiment, the removable tab 168 includes a window 166 allowing a merchant to view certain information on the card 160 without the foldable envelope carrier 100 in any way. This is useful because the card 160 may be provided with a unique control number allowing a merchant and/or the original vendor to track their inventories of debit cards sold within foldable envelope carriers.

At the time of sale of an assembled foldable envelope carrier 100 having an enclosed card 160, a merchant need only grasp the grip 180 or some other portion of the removable tab 168 and tear along the bottom rear perforation 164 to fold the removable tab 168 along the first and second removable tab hinges 162 and 167. In this manner, the merchant exposes the magnetic strip 185 of the card 160 for encoding without removing the card 160 from the foldable envelope carrier 100.

In one embodiment, the first removable tab hinge 162 connects the removable tag 168 with a bottom front border 161 of the front panel 110 of the foldable envelope carrier 100. This bottom front border 161 is separated from the remainder of the front panel 110 by a bottom front perforation in much the same way that the top perforation separates the top front border 116 from the remainder of the front panel 110. The bottom front border 161 is provides additional protection to the portion of the card 160 extending past the edge 199 of the rear panel 120, but it too may be removed by folding or tearing along the bottom front perforation to allow additional access to the card 160.

In one embodiment, the bottom rear perforation 164 comprises a region wherein an alternate perforation 165 having a higher teeth per inch and/or blade to tie ratio is provided to allow a handler of the foldable envelope carrier 100 to more easily start the tearing along the bottom rear perforation 164.

Figure 4:
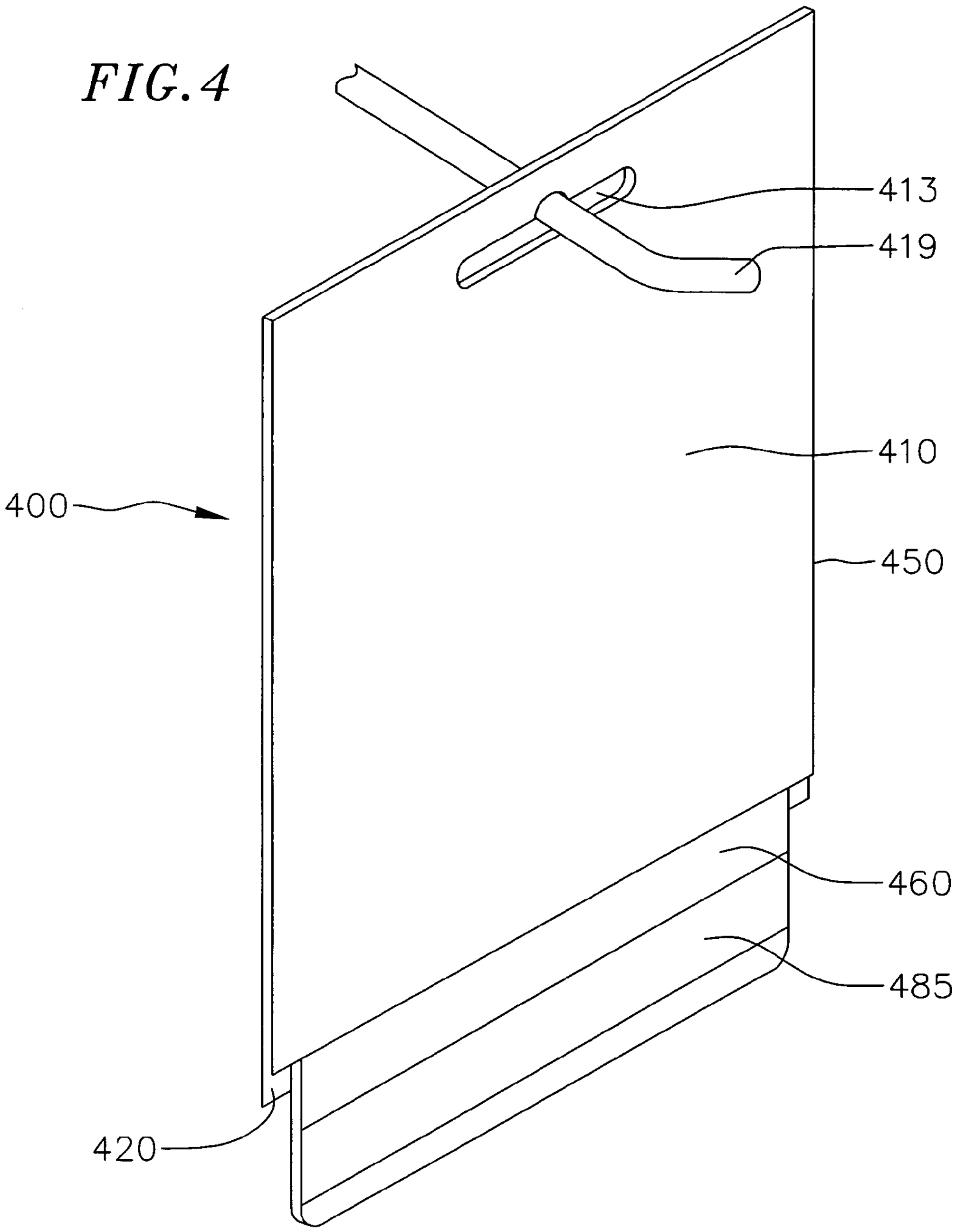
FIG. 4 is a perspective view of an embodiment of a foldable envelope carrier having a card therein, and shown suspended from a display peg, wherein the removable tab and the bottom front border have been removed from the foldable envelope carrier.

In this manner the integrity of an assembled foldable envelope carrier can be maintained while access is granted to encode the magnetic strip of the enclosed card. FIG. 4 shows a perspective view of an embodiment of an assembled foldable envelope carrier 400 having a card 460 therein, and shown suspended from display peg 419 by a peg aperture 413, wherein the removable tab and the bottom front border have been removed from the foldable envelope carrier 400. The front panel 110 and rear panel 120 of the foldable envelope carrier 400 have been folded against each other along a central perforation 450 to provide an enclosed space to contain a portion of the card 460.

In an embodiment of the present invention, because the removable tab 168 and the bottom front border 161 shown in FIG. 1 are not present in FIG. 4, the foldable envelope carrier 400 has a portion of the card 460 projecting therefrom. These two elements have been completely detached from this embodiment of the foldable envelope carrier 400 to expose the portion of the card 460 having the magnetic strip 485. An encodable magnetic strip 485 is disposed transversely across the portion of the card which projects from the foldable envelope carrier 400. As such, the card 460 may be swiped though an encoding device without removing the card from the foldable envelope carrier 400.

Figure 5:
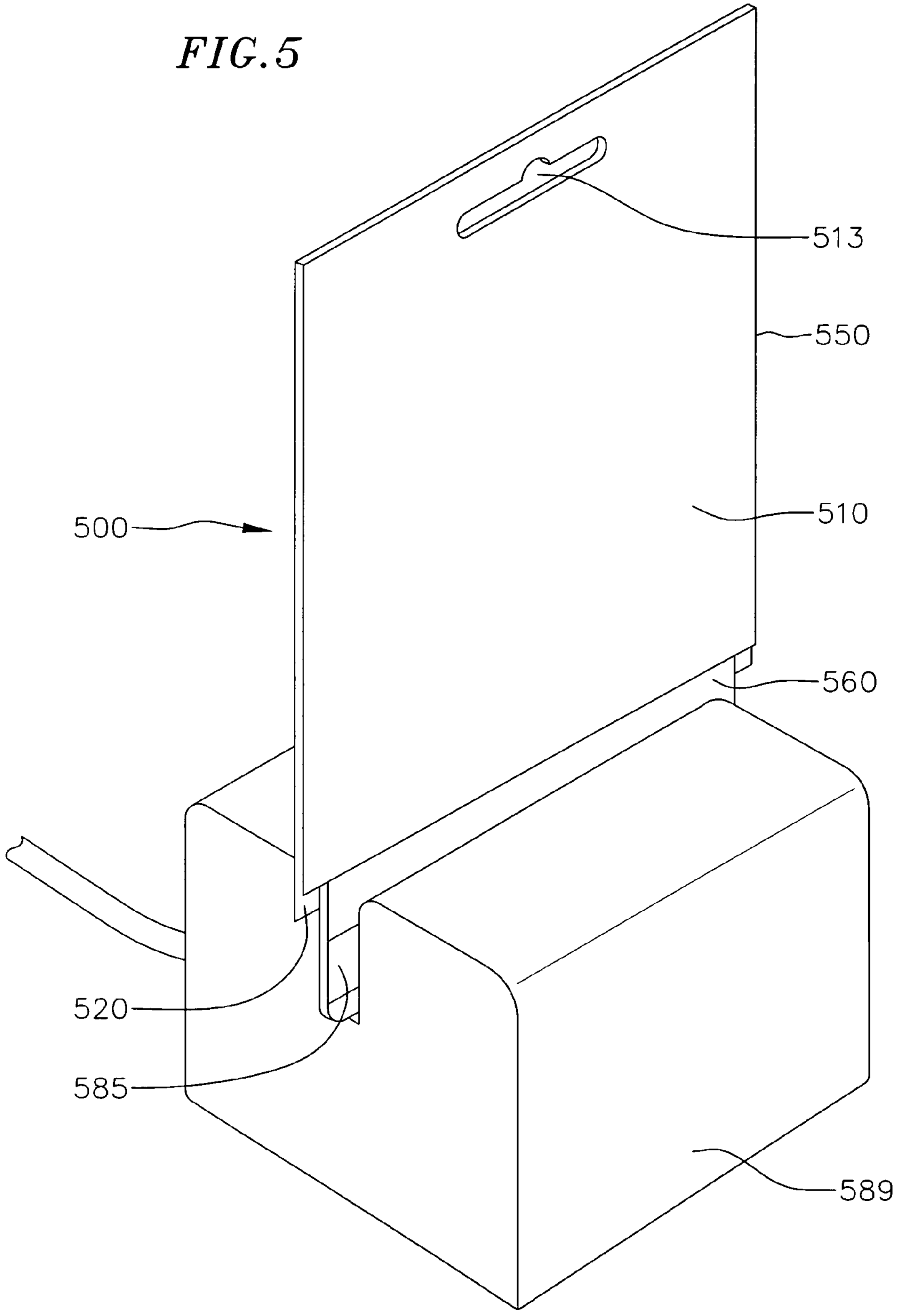
FIG. 5 is a perspective view illustrating the embodiment of FIG. 4 wherein the card disposed within the foldable envelope carrier is being swiped through an encoding device.

Accordingly, FIG. 5 shows a perspective view illustrating the embodiment of FIG. 4 wherein a card 560 disposed within the foldable envelope carrier 500 has a magnetic strip 585 which is swiped through card reader 589. In a similar manner to the aforementioned embodiments, the foldable envelope carrier 500 is provided with an aperture 513, a front panel 510 and a rear panel 520 folded at a central perforation 550.

Figure 6:
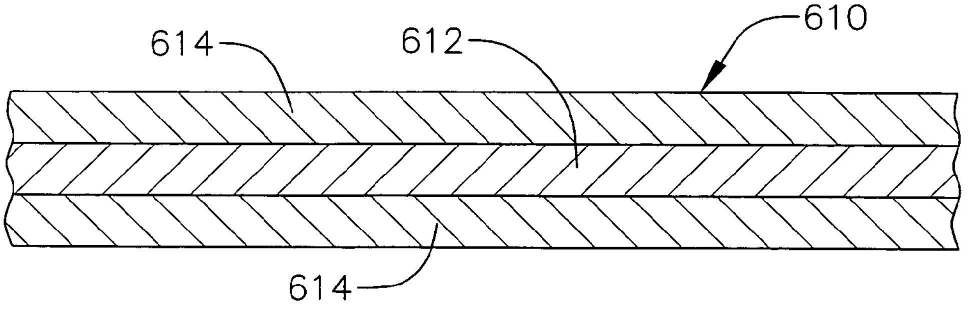
FIG. 6 is a cross sectional view of the foldable envelope carrier of FIG. 1.

FIG. 6 is a cross sectional view of the embodiment of the foldable envelope carrier of shown in FIG. 1. A card display package comprises a foldable envelope carrier constructed of a sheet of material 612 laminated with a plastic material 614 to produce a laminated sheet of material 610.

Figure 7:
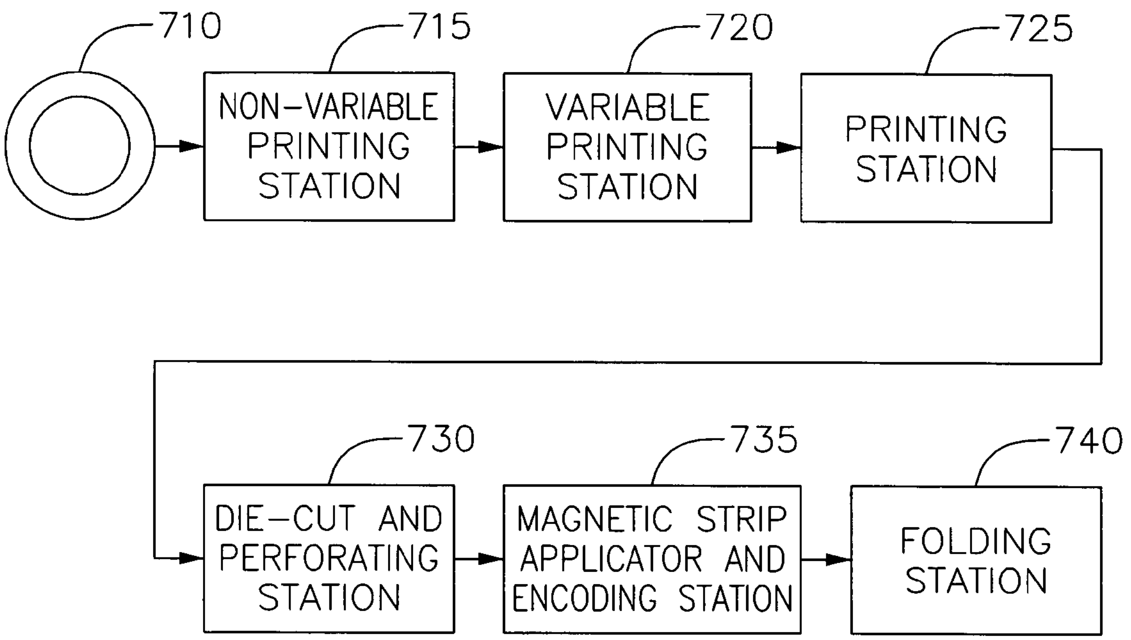
FIG. 7 is a block diagram of an embodiment of a method used to produce a foldable envelope carrier.

FIG. 7 is a block diagram of an embodiment of a method used to produce a foldable envelope carrier. A foldable envelope carrier is formed by first passing a sheet of material 710 through a non-variable printing station 715 where non-variable data of the foldable envelope carrier 100, such as art work, instructional information and promotional information is disposed on a sheet of material 612. This data may, in alternative embodiments, be disposed on each side of the sheet of material 612.

The sheet of material 612 is next passed through a variable printing station 720 where the unique data such as control numbers, bar codes serial numbers are disposed on the sheet of material 612. In alternate embodiments, either the variable or non-variable data may comprise data displayed beneath the window 160 of the removable tab 168 of FIG. 1. After the unique data has been disposed on the sheet of material 612, it is passed through a laminating station 725 where each side of the sheet of material 612 is laminated with the plastic material 614 in a manner known to one skilled in the art.

The laminated sheet of material 610 is then passed through a die cut and perforating station 730 where it is cut to the desired size. The laminated sheet of material 610 is perforated so as to define the front panel 110 and the rear panel 220 of FIG. 1, as well as other portions of the foldable envelope carrier 100 discussed above.

In one alternative embodiment of the present invention, the side front perforation 111, side rear perforation 121, top perforation 151 and alternate perforation 165 all comprise perforation lines having seventeen teeth per inch, and a blade to tie ratio of 70%. In another alternative embodiment, the central perforation 150 and bottom front perforation 163 both comprise perforation lines having two teeth per inch, and a blade to tie ratio of 50%. Further, in another alternative embodiment, the second removable tab hinge 167 comprises a straight bladed cut with no perforation. It is understood that these perforation specifications are exemplary and that the invention may be carried out with a foldable envelope carrier having different perforation specifications.

For example, in yet another alternative embodiment, the central perforation 150 comprises a "perforation" line having a blade to tie ratio of 0%; i.e. the central perforation line may be simply a fold line having no perforations therein.

With the foldable envelope carrier 100 correctly sized and shaped, the card 160 is passed through a magnetic strip applicator and encoder station 735 to apply the magnetic strip 185, followed by the foldable envelope carrier 100 being passed through a folding station 740. The card 160 is then assembled together with the foldable envelope carrier 100, by one of the methods described above.

What is claimed is:

1. A card carrier system, comprising:

a card;

a first panel;

a second panel opposing the first panel; and a detachable tab connected to the first panel;

wherein the card is provided between the first panel and the second panel and secured to at least one of the first panel and the second panel such that the card is at least partially covered by at least one of first panel and the second panel, and wherein the card has an exposed portion extending past both the first panel and the second panel such that when the detachable tab is removed, the exposed portion of the card may be encoded while the remainder of the card is protected between the first panel and the second panel.

2. The card carrier system of claim 1, wherein the card is a magnetically encodable card.

3. The card carrier system of claim 1, wherein the detachable tab is connected to both first panel and the second panel.

4. The card carrier system of claim 1, wherein the detachable tab is connected to at least one of the first panel and the second panel by perforated lines.

5. The card carrier system of claim 1, wherein the detachable tab includes a window.

6. The card carrier system of claim 1, wherein the card has a portion thereof extending beyond an edge of at least one of first panel and the second panel.

7. The card carrier system of claim 1, wherein the first panel is attached to the second panel at a fold line.

8. The card carrier system of claim 7, wherein the fold line is a perforated line.

9. A method for packaging and processing a card mounted in a card carrier, comprising:

providing a first panel and a second panel opposing the first panel;

providing a card between the first panel and the second panel secured to at least one of the first panel and the second panel such that the card is at least partially covered by at least one of first panel and the second panel;

providing a detachable tab connected to at least one of the first panel and the second panel;

performing at least one of a folding or detaching operation on the detachable tab to expose a portion of the card covered by the detachable tab wherein said portion extends past both the first panel and the second panel so that the exposed portion of the card may be encoded while the remainder of the card is protected between the first panel and the second panel.

10. The method of claim 9, further comprising passing the exposed portion of the card through an encoder to encode the card.

11. A card carrier system, comprising:

a card;

a first panel;

a second panel opposing the first panel;

a detachable tab connected to at least one of the first panel and the second panel; and a hanger area comprising a portion of both the first panel and the second panel having an opening passing through both the first panel and the second panel allowing the card carrier system to be mounted on an in-store display rack;

wherein the card is provided between the first panel and the second panel and secured to at least one of the first panel and the second panel such that the card is at least partially covered by at least one of first panel and the second panel, and wherein the detachable tab taken together with at least one of the first panel and the second panel covers a greater portion of the card than at least one of the first panel and the second panel alone.

12. The card carrier system of claim 11, wherein the card is a magnetically encodable card.

13. The card carrier system of claim 11, wherein the detachable tab is connected to both first panel and the second panel.

14. The card carrier system of claim 11, wherein the detachable tab is connected to at least one of the first panel and the second panel by perforated lines.

15. The card carrier system of claim 11, wherein the detachable tab includes a window.

16. The card carrier system of claim 11, wherein the card has a portion thereof extending beyond an edge of at least one of first panel and the second panel.

17. The card carrier system of claim 11, wherein the first panel is attached to the second panel at a fold line.

18. The card carrier system of claim 17, wherein the fold line is a perforated line.

* * * * *